US011947570B2

(12) United States Patent
Wang et al.

(10) Patent No.: US 11,947,570 B2
(45) Date of Patent: Apr. 2, 2024

(54) DATA AUGMENTATION

(71) Applicant: International Business Machines Corporation, Armonk, NY (US)

(72) Inventors: Qing Wang, Beijing (CN); Shi Lei Zhang, Beijing (CN); Yonghua Lin, Beijing (CN)

(73) Assignee: International Business Machines Corporation, Armonk, NY (US)

(*) Notice: Subject to any disclaimer, the term of this patent is extended or adjusted under 35 U.S.C. 154(b) by 509 days.

(21) Appl. No.: 16/558,869

(22) Filed: Sep. 3, 2019

(65) Prior Publication Data

US 2021/0064639 A1  Mar. 4, 2021

(51) Int. Cl.
*G06F 16/28* (2019.01)
*G06N 3/08* (2023.01)

(52) U.S. Cl.
CPC ............. *G06F 16/285* (2019.01); *G06N 3/08* (2013.01)

(58) Field of Classification Search
CPC ................................ G06F 16/285; G06N 3/08
USPC ......................................................... 707/739
See application file for complete search history.

(56) References Cited

U.S. PATENT DOCUMENTS

| 8,457,950 | B1 * | 6/2013 | Gardner | G10L 15/1815 |
| | | | | 704/10 |
| 9,336,484 | B1 * | 5/2016 | Iverson | G06F 18/2433 |
| 10,719,301 | B1 * | 7/2020 | Dasgupta | G06F 8/34 |
| 10,963,758 | B2 * | 3/2021 | Rabinovich | G06N 3/045 |
| 2012/0016816 | A1 * | 1/2012 | Yanase | G06N 20/20 |
| | | | | 706/10 |
| 2018/0240243 | A1 * | 8/2018 | Kim | G06T 7/162 |
| 2018/0247227 | A1 | 8/2018 | Holtham | |
| 2018/0285663 | A1 | 10/2018 | Viswanathan et al. | |
| 2019/0294320 | A1 * | 9/2019 | Guttmann | G06V 20/70 |
| 2019/0294984 | A1 * | 9/2019 | Guttmann | G06V 40/10 |
| 2020/0311613 | A1 * | 10/2020 | Ma | G06N 20/20 |

FOREIGN PATENT DOCUMENTS

| CN | 108830294 A | 5/2018 |
| KR | 1018430661 A | 5/2018 |

OTHER PUBLICATIONS

Cubuk et al., "AutoAugment: Learning Augmentation Policies from Data", arXiv e-prints, Apr. 11, 2019, 14 pages, <https://arxiv.org/pdf/1805.09501.pdf>.

(Continued)

*Primary Examiner* — Sherief Badawi
*Assistant Examiner* — Earl Levi Elias
(74) *Attorney, Agent, or Firm* — Gilbert Harmon, Jr.; Sonny Z. Zhan (57) ABSTRACT

A computer-implemented method for data augmentation is provided according an embodiment of the present disclosure. In the method, a first feature vector for input data may be obtained based on a first model. The input data may be clustered to a plurality of clusters. For each of the clusters, a second feature vector may be obtained based on the first model. Then, a similarity between the first feature vector and the second feature vector may be estimated for each of the clusters. At least one cluster of the plurality of clusters for which the similarity is lower than a threshold may be determined. Moreover, data augmentation may be performed to the at least one cluster.

14 Claims, 6 Drawing Sheets

(56) References Cited

OTHER PUBLICATIONS

Inoue, "Data Augmentation by Pairing Samples for Images Classification", ICLR 2018 Conference Track, 6th International Conference on Learning Representations, Vancouver, BC, Canada, Apr. 30-May 3, 2018, 10 pages, <https://openreview.net/forum?id=SJn0sLgRb>.

Lemley et al., "Smart Augmentation—Learning an Optimal Data Augmentation Strategy", arXiv e-prints, Mar. 24, 2017, 12 pages, <https://arxiv.org/pdf/1703.08383.pdf>.

Wang et al., "The Effectiveness of Data Augmentation in Image Classification using Deep Learning", Printed Aug. 9, 2019, 8 pages, <http://cs231n.stanford.edu/reports/2017/pdfs/300.pdf>.

Mell et al., "The NIST Definition of Cloud Computing", Recommendations of the National Institute of Standards and Technology, Special Publication 800-145, Sep. 2011, 7 pages.

\* cited by examiner

DATA AUGMENTATION

BACKGROUND

The present invention relates to data processing, and more specifically, to data augmentation.

Data augmentation is a process of supplementing a dataset with similar data that is created from information in the dataset. Data augmentation is widely used in machine learning and deep learning, especially for small dataset learning or imbalanced dataset learning. For example, in medical image processing, some samples of data in a dataset are scare. Therefore, it is necessary to perform data augmentation on the dataset for further processing.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an embodiment of the present disclosure, there is provided a computer-implemented method for data augmentation. In the method, a first feature vector for input data may be obtained based on a first model. The input data may be clustered to a plurality of clusters. For each cluster of the plurality of clusters, a second feature vector may be obtained based on the first model. Then, a similarity between the first feature vector and the second feature vector may be estimated for each of the plurality of clusters. At least one cluster of the plurality of clusters for which the similarity is lower than a threshold may be determined. Moreover, data augmentation may be performed to the at least one cluster.

According to an embodiment of the present disclosure, there is provided a system for data augmentation. The system may comprise one or more processing units, a memory coupled to at least one of the processing units, and a set of computer program instructions stored in the memory. The set of computer program instructions may be executed by at least one of the processing units to perform the above method.

According to an embodiment of the present disclosure, there is provided a computer program product for data augmentation. The computer program product may comprise a computer readable storage medium having program instructions embodied therewith. The program instructions executable by a processor causes the processor to perform the above method.

In addition to the exemplary aspects and embodiments described above, further aspects and embodiments will become apparent by reference to the drawings and by study of the following descriptions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
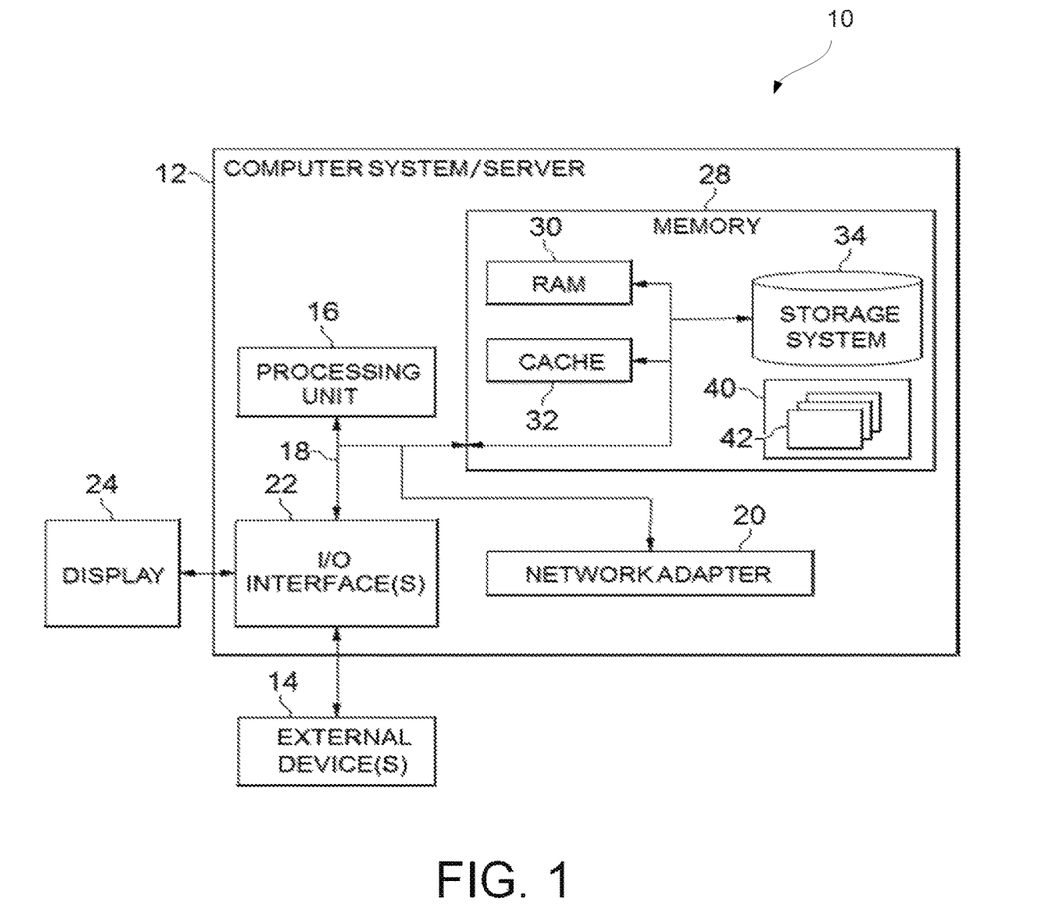
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (IO) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
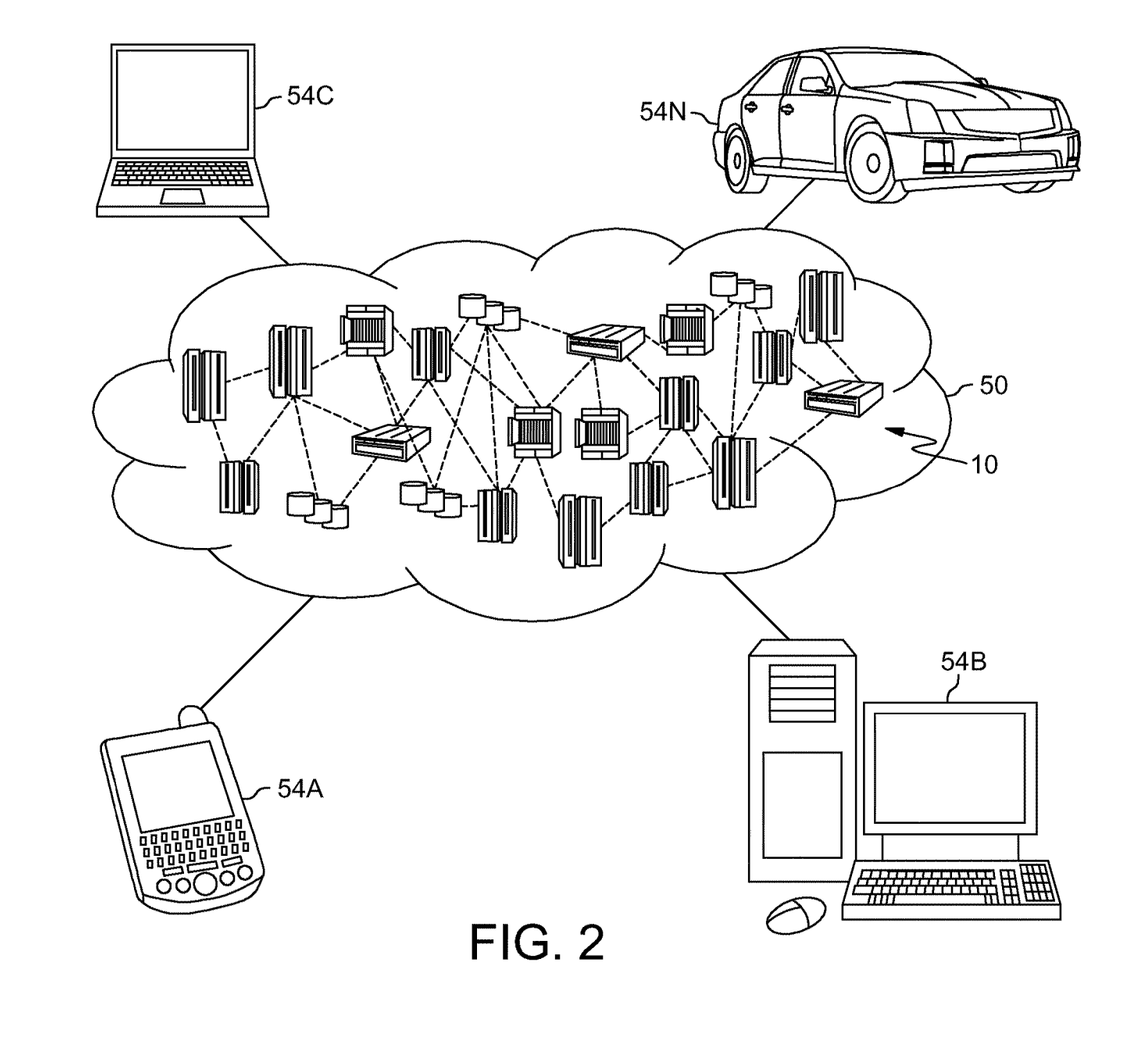
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
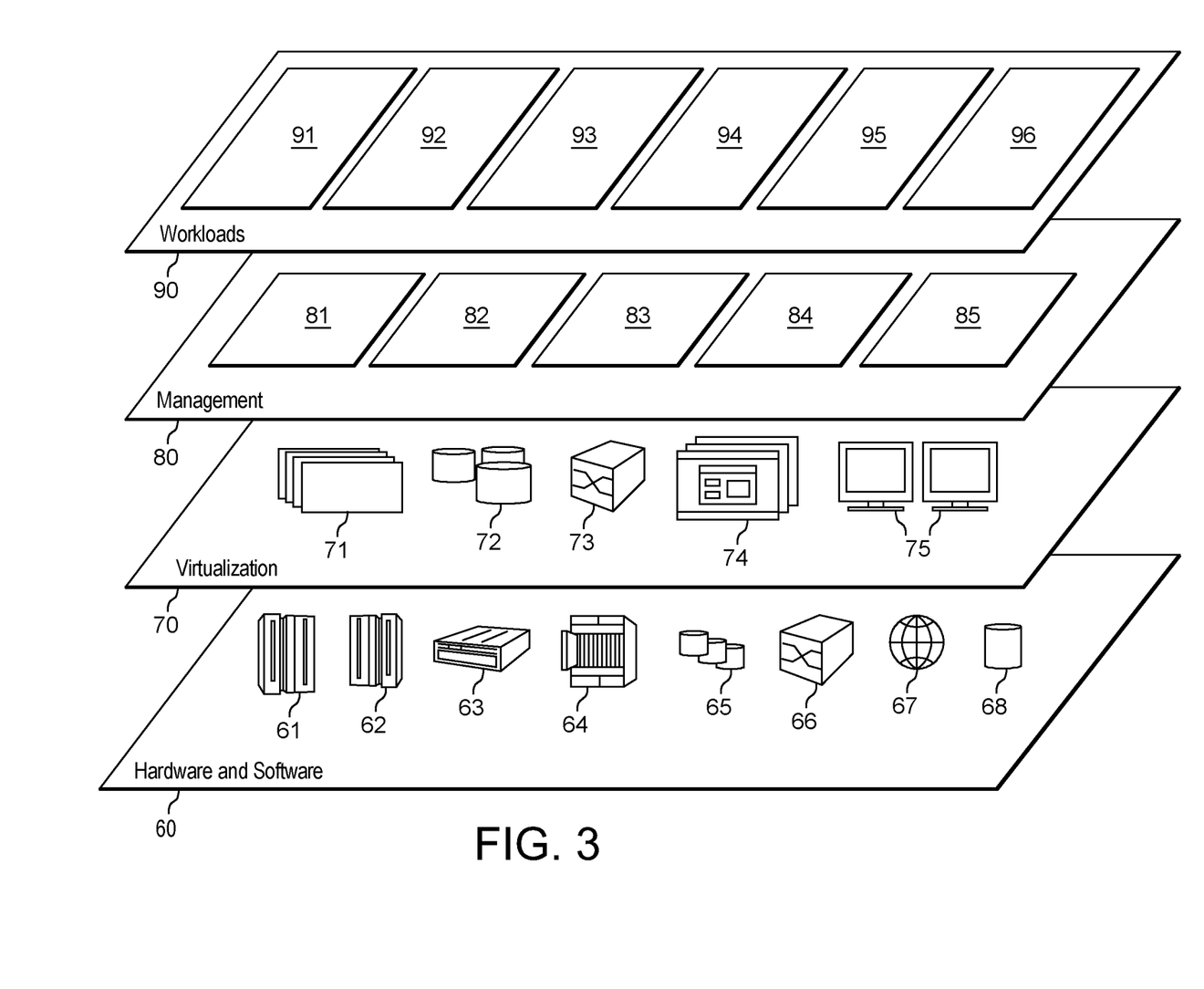
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data augmentation 96.

A dataset may be used to train a neural network. For the trained neural network, accuracy of machine learning predictions is highly dependent on quality and variety of data within the dataset. If the dataset has enough quality samples of data, the prediction accuracy might be effective. However, if there is insufficient data in the dataset, overfitting may be generated, that is, the trained neural network is highly biased to the dataset, and may be difficult to generalize and make predictions for new data.

Data augmentation may be performed on the dataset to improve the quality and variety of the data. However, data augmentation may also be a time and resource consuming process. Moreover, some augmentation methods may be useless for learning, or even have side effects for learning.

Embodiments of the present disclosure provide a method for data augmentation.

Figure 4:
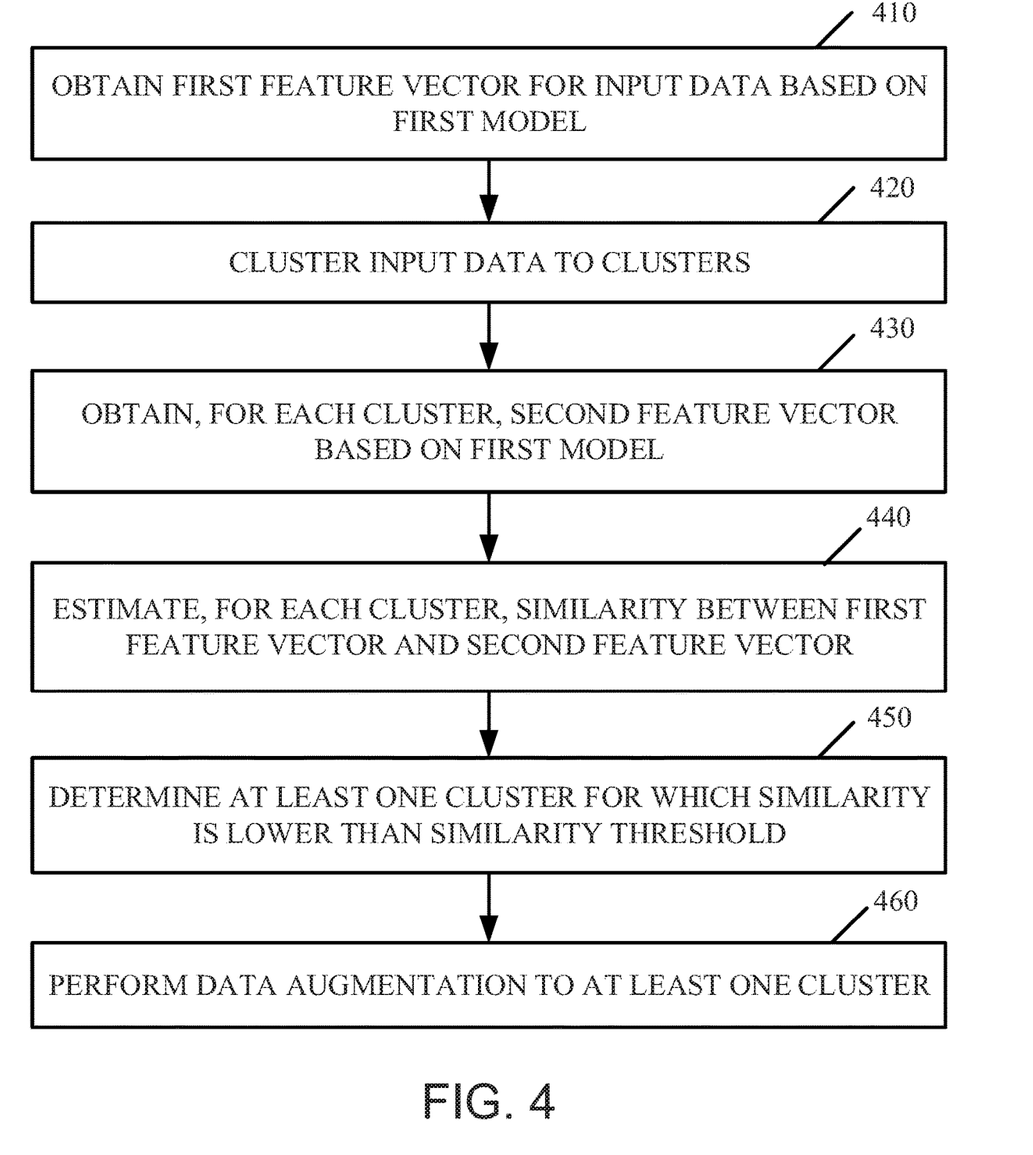
FIG. 4 depicts a schematic flowchart of a method for data augmentation according to an embodiment of the present disclosure.

With reference now to FIG. 4, it shows a schematic flowchart of a method for data augmentation according to an embodiment of the present disclosure. The embodiment will be described in detail below in conjunction with FIGS. 5-6.

It can be noted that the processing of data augmentation according to embodiments of this disclosure could be implemented by a computing device, for example, the computer system/server 12 shown in FIG. 1.

At block 410, the computing device obtains a first feature vector for input data based on a first model.

In some embodiments, the first model may be implemented by a convolutional neural network (CNN). The convolutional neural network is a type of artificial neural network that is commonly used for image analysis. The convolutional neural network may comprise an input layer, one or more hidden layers and an output layer. Each layer may include a number of nodes. The nodes in each layer may connect to some or all nodes in a subsequent layer. The convolutional neural network may be considered "deep" when it includes two or more hidden layers. Although the convolutional neural network is most widely used for image analysis, it may also be used for other data analysis and classification tasks, for example, categorizing images in photo collections, speech and audio recognition tasks, and the like. The input data may comprise images, videos, audio files, or the like. In some other embodiments, the first model may be implemented by other artificial neural network, if applicable.

In some embodiments, the computing device may provide the input data to the first model, such as, the convolutional neural network, as described above. Then, the first model may analyze the input data. In some embodiments, the first model may comprise a plurality of filters in the hidden layers. The filters may detect patterns for images in the input data. The patterns may also be referred to as high-lever features. The patterns in an image may comprise a plurality of edges, shapes, textures, objects, colors and the like. The filters in deep hidden layers may be able to detect specific objects, such as, eyes, ears, feathers, fur, hair, or the like. Further, deeper filters may also be able to detect full dogs, cats, or the like. The filters may be implemented by a plurality of detectors, such as, an edge detector, a corner detector, a shape detector, or the like.

Therefore, the first model may make predictions corresponding to the patterns in the input data. The first model may then generate the first feature vector representing the patterns. The feature vector used herein, for example, may be a two-dimensional matrix.

At block 420, the computing device clusters the input data to a plurality of clusters.

It is to be understood that, clustering is a method of organizing data into representative groups based upon similar characteristics. Each group may be referred to as a cluster. Each member of a cluster may have more characteristics in common with other members of the same cluster than with members of the other clusters. The most representative point within the cluster may be referred to as a centroid of the cluster. Typically, the centroid is a mean of values of the points of data in the cluster.

In some embodiments, the clustering process may be performed in any clustering method known in the art, such as, Centroid based clustering, Hierarchical Clustering, Distribution based clustering, Density based Clustering, or the like.

After the clustering, at block 430, the computing device obtains, for each of the plurality of clusters, a second feature vector based on the first model.

In some embodiments, the computing device may provide each of the plurality of clusters to the first model. For each cluster, the first model may make predictions on patterns corresponding to the cluster, and generate the second feature vector representing the patterns. Therefore, the computing device may obtain a plurality of second feature vectors corresponding to the plurality of clusters.

In some other embodiments, the computing device may firstly determine representative data for each cluster. A distance between the representative data and the centroid of the cluster is lower than a distance threshold. The distance threshold may be set specific to each cluster. Moreover, the distance threshold may also be set corresponding to all clusters. Then, the computing device may provide the representative data for each cluster, not the whole cluster, to the first model. The first model may predict patterns corresponding to the representative data for each cluster. Therefore, the second feature vector is generated by the first model to represent the patterns corresponding to the representative data.

At block 440, the computing device estimates, for each of the plurality of clusters, a similarity between the first feature vector and the second feature vector.

In some embodiments, the similarity may be estimated based on a distance with dimensions representing the first feature vector and the second feature vector. For example, the computing device may determine the similarity distance between the first feature vector and the second feature vector based on any one of the followings: Euclidian distance, Manhattan distance, Hamming distance, cosine similarity, and the like.

It is to be noted that, a shorter similarity distance refers to a higher similarity between two feature vectors, compared with a longer similarity distance. Therefore, if a second feature vector for a cluster has a relatively short similarity distance from the first feature vector, the patterns corresponding to the cluster may be more similar to the patterns corresponding to the input data. On the other hand, if a second feature vector for a cluster has a relatively long similarity distance from the first feature vector, the patterns corresponding to the cluster may be less similar to the patterns corresponding to the input data.

Based on the similarity estimation, at block 450, the computing device determines at least one cluster of the plurality of clusters for which the similarity is lower than a similarity threshold.

In some embodiments, the computing device may classify the plurality of clusters into two groups based on the estimated similarity. For example, a first group comprises the at least one cluster for which the similarity is lower than the similarity threshold. A second group comprises the remaining clusters for which the similarity is equal or higher than the similarity threshold. It can be noted that, the similarity threshold can be set based on the input data according to actual needs.

In other word, the patterns corresponding to each of the at least one cluster in the first group are less similar to the patterns corresponding to the input data, compared with the patterns corresponding to the clusters in the second group. Thus, the computing device may determine that the clusters in the first group may need to be augmented, to improve prediction accuracy. Moreover, the computing device may also determine that the clusters in the second group may not need to be augmented, to save time and computing resources.

Therefore, at block 460, the computing device performs data augmentation to the at least one cluster.

There are many kinds of augmentation methods known in art, such as, mirroring, flipping, random cropping, noise adding, rotation, color space changing, or the like. In some embodiments, the computing may determine an optimal augmentation method specific to each of the at least one cluster.

In some embodiments, for each of the at least one cluster, the computing device may perform a plurality of augmentation methods on the cluster to obtain a plurality of augmented clusters.

Then, for each of the plurality of augmented clusters, the computing device may obtain a third feature vector for the augmented cluster based on the first model. For example, the computing device may provide each augmented cluster to the first model, such that the first model may predict patterns corresponding to each augmented cluster, and generate the respective third feature vectors representing the patterns. Further, for each of the augmented clusters, the computing device may calculate a loss based on the first feature vector and the third feature vector.

It is to be noted that the loss may be calculated based on a loss function known in the art. For example, the loss is related to a similarity between the first feature vector and the third feature vector. If a third feature vector for an augmented cluster has a relatively high similarity with the first feature vector, the loss for the augmented cluster may be relatively low. On the other hand, if a third feature vector for an augmented cluster has a relatively low similarity with the first feature vector, the loss for the augmented cluster may be relatively high. The similarity may be estimated based on a distance between the first feature vector and the third feature vector. As described above, the similarity distance between the first feature vector and the third feature vector may be estimated based on any one of the followings: Euclidian distance, Manhattan distance, Hamming distance, cosine similarity, and the like.

Therefore, the computing device may select one of the plurality of augmented clusters for which the loss is the lowest, as an optimal augmented cluster. That is, the similarity between the first feature vector and the third feature vector for the optimal augmented cluster is highest, such that the patterns for the optimal augment cluster is most similar with the patterns for the input data. Thus, the augmentation method corresponding to the optimal augmented cluster is the optimal augmentation method for the cluster. Accordingly, the computing device may sequentially select the respective optimal augmented clusters for the respective cluster of the at least one cluster.

Furthermore, the computing device may combine the input data with the respective optimal augmented clusters, as a training dataset, to train a second model. The second model may be a neural network. In order to train a neural network, it is important to have access to enough samples of data. Not having enough quality data may generate overfitting. Compared with the input data, the training dataset has improved size and quality, such that a prediction accuracy for the second model can be increased and overfitting can be reduced.

According to embodiments of the present disclosure, data augmentation may be performed on the input data in an efficient manner. Size and quality of the dataset can be improved. Moreover, computation and time resource can be saved.

Figure 5:
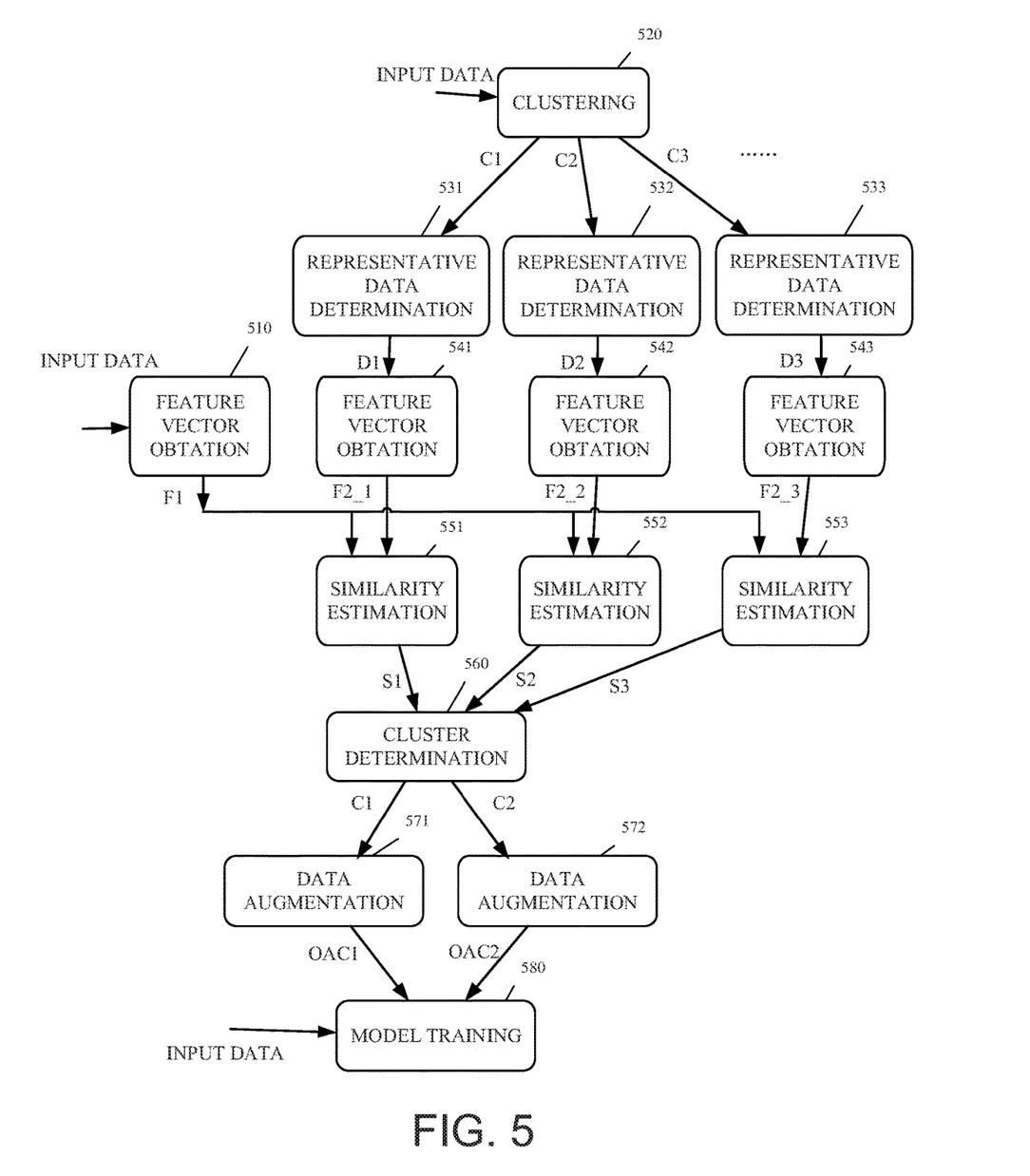
FIG. 5 depicts a schematic diagram for illustrating a process of data augmentation in which the method shown in FIG. 4 is implemented.

FIG. 5 shows a schematic diagram for illustrating data augmentation in which the method shown in FIG. 4 is implemented.

At block 510, the computing device may obtain a first feature vector F1 for input data based on a first model.

At block 520, the computing device may cluster the input data to a plurality of clusters, for example, a first cluster C1, a second cluster C2, a third cluster C3, and the like. Number of the clusters is shown as three in FIG. 5, which is only for illustrative, but not limit the scope of the embodiments. It may be understood that two or more clusters may generated by the computing device.

At block 531, the computing device may determine first representative data D1 for the first cluster C1. For example, the computing device may determine a centroid of the first cluster C1, as a first centroid. Moreover, the computing device may determine the respective distances between each data sample in the first cluster C1 and the first centroid. If a distance between a data sample and the first centroid is lower than a first distance threshold, that data sample belongs to the first representative data D1. Then at block 541, the computing device may obtain a second feature vector F2_1 for the first representative data D1 based on the first model. At block 551, the computing device may estimate similarity between the first feature vector F1 and the second feature vector F2_1, as a first similarity S1.

At block 532, the computing device may determine second representative data D2 for the second cluster C2. For example, the computing device may determine a centroid of the second cluster C2, as a second centroid. Moreover, the computing device may determine the respective distances between each data sample in the second cluster C2 and the second centroid. If a distance between a data sample and the second centroid is lower than a second distance threshold, that data sample belongs to the second representative data D2. Then at block 542, the computing device may obtain a second feature vector F2_2 for the second representative data D2 based on the first model. At block 552, the computing device may estimate similarity between the first feature vector F1 and the second feature vector F2_2, as a second similarity S2.

At block 533, the computing device may determine third representative data D3 for the third cluster C3. For example, the computing device may determine a centroid of the third cluster C3, as a third centroid. Moreover, the computing device may determine the respective distances between each data sample in the third cluster C3 and the third centroid. If a distance between a data sample and the third centroid is lower than a third distance threshold, that data sample belongs to the third representative data D3. Then at block 543, the computing device may obtain a second feature vector F2_3 for the third representative data D3 based on the first model. At block 553, the computing device may estimate similarity between the first feature vector F1 and the second feature vector F2_3, as a third similarity S3.

In some embodiments, the first distance threshold, the second distance threshold, and the third distance threshold may be set independently according to the corresponding clusters.

Then, at block 560, the computing device may determine at least one cluster of the plurality of clusters for which the similarity is lower than a similarity threshold. As shown in FIG. 5, for example, when the first similarity S1 and the second similarity S2 are lower than the similarity threshold and the third similarity is higher than the similarity threshold, the computing device may determine the first cluster C1 and the second cluster C2 as the at least one cluster.

Therefore, data augmentation needs to be performed on the first cluster C1 and the second cluster C2 at block 571 and block 572. Moreover, the third cluster C3 does not need to be augmented, such that computation and time consuming can be reduced.

Figure 6:
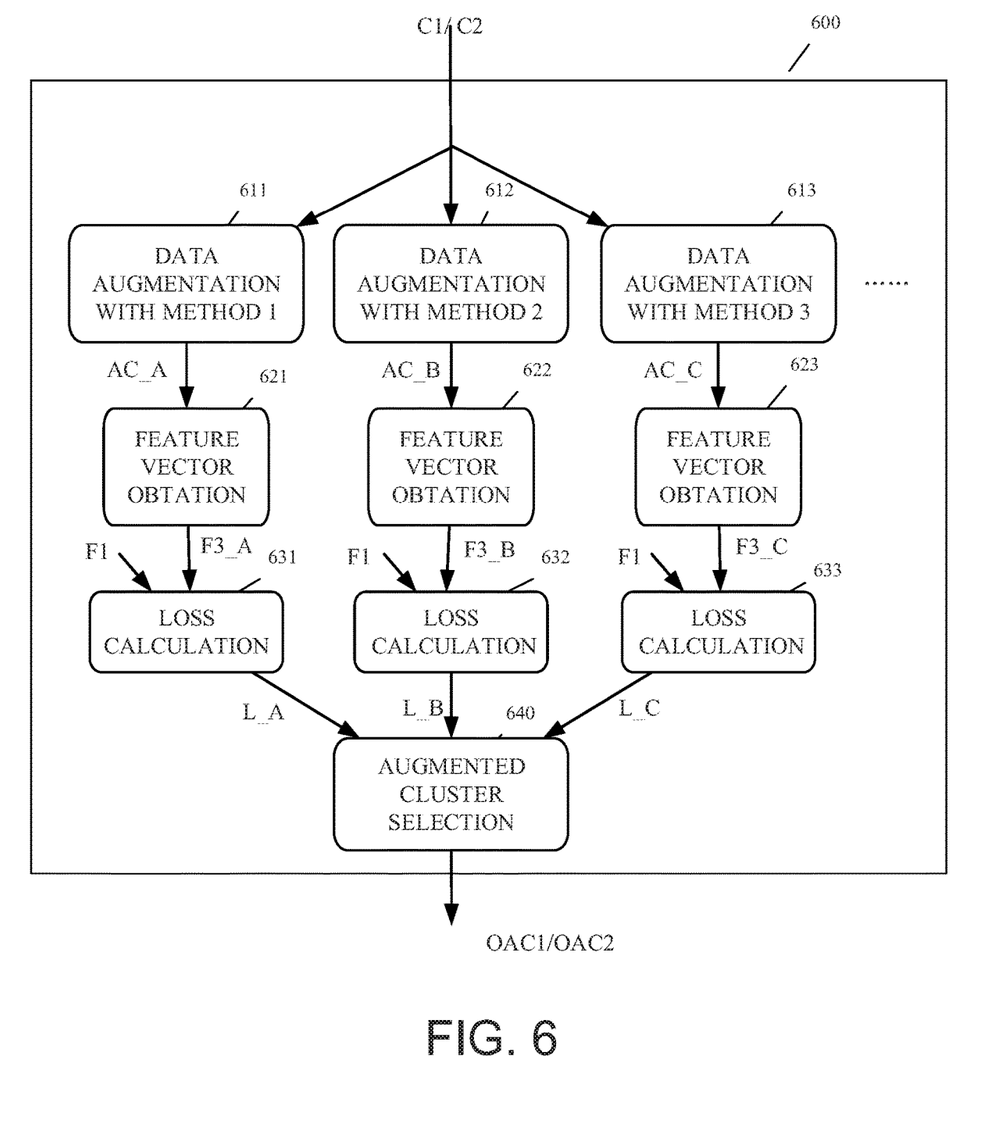
FIG. 6 depicts a schematic diagram for illustrating a process of data augmentation in which the method shown in FIG. 4 is implemented.

FIG. 6 shows a schematic diagram for illustrating a process of data augmentation in which the method shown in FIG. 4 is implemented. Specifically, block 600 shown in FIG. 6 can be implemented in block 571 and block 572 shown in FIG. 5.

At block 600, the computing device may perform a plurality of augmentation methods on the cluster, for example, the first cluster C1 or the second cluster C2. For illustrative, the following processes are described with respect to the first cluster C1. It can be understood that the following processes may also be implemented for the second cluster C2.

In some embodiments, the plurality of augmentation methods may comprise a first augmentation method corresponding to block 611, a second augmentation method corresponding to block 612, a third augmentation method corresponding to block 613, and the like. Only three augmentation methods are shown in FIG. 6, which is only for illustrative, but in no way to limit the scope of the embodiments.

At block 611, the computing device may perform the first augmentation method on the first cluster C1 to obtain a first augmented cluster AC_A. At block 621, the computing device may obtain a third feature vector F3_A for the first augmented cluster AC_A based on the first model. Then, at block 631, the computing device may calculate a first loss L_A based on a similarity between the first feature vector F1 and the third feature vector F3_A.

At block 612, the computing device may perform the second augmentation method on the first cluster C1 to obtain a second augmented cluster AC_B. At block 622, the computing device may obtain a third feature vector F3_B for the second augmented cluster AC_B based on the first model. Then, at block 632, the computing device may calculate a second loss L_B based on a similarity between the first feature vector F1 and the third feature vector F3_B.

At block 613, the computing device may perform the third augmentation method on the first cluster C1 to obtain a third augmented cluster AC_C. At block 623, the computing device may obtain a third feature vector F3_C for the third augmented cluster AC_C based on the first model. Then, at block 633, the computing device may calculate a third loss based on a similarity between the first feature vector F1 and the third feature vector F3_C.

Based on the loss calculation, at block 640, the computing device may select one of the plurality of augmented clusters as an optimal augmented cluster. for which the loss is the lowest. In an embodiment, the loss for the optimal augmented cluster is the lowest among all of the calculated loss. For example, if the first loss L_A is lower than the second loss L_B and the third loss L_C, the computing device may determine the first augmented cluster ACA is the optimal augmented cluster OAC1 for the first cluster C1.

Moreover, for the second cluster C2, the computing device may determine an optimal augmented cluster OAC2 by implementing the process at block 600.

Back to FIG. 5, at block 580, the computing device may combine the input data with the respective optimal augmented clusters OAC1, OAC2 to train a second model.

According to embodiments of the present disclosure, the method for data augmentation may improve size and quality of a training dataset, and save computation and time resources.

Additionally, in some embodiments of the present disclosure, an apparatus for data augmentation can be provided. The apparatus may comprise one or more processing units, a memory coupled to at least one of the processing units, and a set of computer program instructions stored in the memory. The set of computer program instructions may be executed by at least one of the processing units to perform the above method.

In some other embodiments of the present disclosure, a computer program product for data augmentation can be provided. The computer program product may comprise a computer readable storage medium having program instructions embodied therewith. The program instructions executable by a processing unit causes the processing unit to perform the above method.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for augmenting a dataset, used by a data augmentation application, to train a neural network, the computer-implemented method comprising:
    obtaining, by one or more processing units, a first feature vector for input data based on a first model, wherein the first model comprises one or more filters capable of detecting specific objects comprising at least one of eyes, ears, feathers, fur, or hair;
    clustering, by one or more processing units, the input data to a plurality of clusters;
    obtaining, by one or more processing units, for each cluster of the plurality of clusters, a second feature vector based on the first model;
    estimating, by one or more processing units, for each cluster of the plurality of clusters, a similarity between the first feature vector and the second feature vector;
    determining, by one or more processing units, at least one cluster of the plurality of clusters for which the similarity is lower than a similarity threshold; and
    performing, by one or more processing units, data augmentation to the at least one cluster to train a neural network, wherein performing, by a data augmentation application, the data augmentation comprises:
        for each of the at least one cluster:
            performing, by one or more processing units, a plurality of augmentation methods on the cluster to obtain a plurality of augmented clusters;
            for each cluster of the plurality of augmented clusters:
                obtaining, by one or more processing units, a third feature vector for the augmented cluster based on the first model;
                calculating, by one or more processing units, a loss based on the first feature vector and the third feature vector;
            selecting, by one or more processing units, one of the plurality of augmented clusters for which the loss is the lowest, as an optimal augmented cluster; and
            combining, by one or more processing units, the input data with the respective optimal augmented clusters to train a second model.

2. The method according to claim 1, wherein obtaining, for each cluster of the plurality of clusters, a second feature vector based on the first model comprises:
    for each cluster of the plurality of clusters:
        determining, by one or more processing units, representative data for the cluster, wherein a distance between the representative data and a centroid of the cluster is lower than a distance threshold; and
        obtaining, by one or more processing units, the second feature vector for the representative data based on the first model.

3. The method according to claim 1, wherein the similarity is estimated based on a Euclidean distance between the first feature vector and the second feature vector.

4. The method according to claim 1, wherein the first model is a convolutional neural network.

5. The method according to claim 1, wherein the plurality of augmentation methods comprise one or more of followings: mirroring, flipping, cropping, noise adding, rotation, and color space changing.

6. A system for augmenting a dataset, used by a data augmentation application, to train a neural network, the system comprising:
- one or more processing units;
- a memory coupled to at least one of the processing units; and
- a set of computer program instructions stored in the memory as part of a data augmentation application and executed by at least one of the processing units in order to perform actions of:
  - obtaining a first feature vector for input data based on a first model, wherein the first model comprises one or more filters capable of detecting specific objects comprising at least one of eyes, ears, feathers, fur, or hair;
  - clustering the input data to a plurality of clusters;
  - obtaining, for each of the plurality of clusters, a second feature vector based on the first model;
  - estimating, for each cluster of the plurality of clusters, a similarity between the first feature vector and the second feature vector;
  - determining at least one cluster of the plurality of clusters for which the similarity is lower than a similarity threshold; and
  - performing data augmentation to the at least one cluster to train a neural network, wherein the actions further comprise:
    - for each cluster of the at least one cluster,
      - performing a plurality of augmentation methods on the cluster to obtain a plurality of augmented clusters;
      - for each cluster of the plurality of augmented clusters,
        - obtaining a third feature vector for the augmented cluster based on the first model;
        - calculating a loss based on the first feature vector and the third feature vector;
      - selecting one of the plurality of augmented clusters for which the loss is the lowest, as an optimal augmented cluster; and
      - combining the input data with the respective optimal augmented clusters to train a second model.

7. The system according to claim 6, wherein the actions further comprise:
for each cluster of the plurality of clusters,
  determining representative data for the cluster, wherein a distance between the representative data and a centroid of the cluster is lower than a distance threshold; and
  obtaining the second feature vector for the representative data based on the first model.

8. The system according to claim 6, wherein the similarity is estimated based on a Euclidean distance between the first feature vector and the second feature vector.

9. The system according to claim 6, wherein the first model is a convolutional neural network.

10. The system according to claim 6, wherein the plurality of augmentation methods comprise one or more of followings: mirroring, flipping, cropping, noise adding, rotation, and color space changing.

11. A computer program product for augmenting a dataset, used by a data augmentation application, to train a neural network, the computer program product comprising:
a computer readable storage medium having program instructions embodied therewith, the program instructions executable by a processing unit, as part of a data augmentation application, to cause the processing unit to:
obtain a first feature vector for input data based on a first model, wherein the first model comprises one or more filters capable of detecting specific objects comprising at least one of eyes, ears, feathers, fur, or hair;
cluster the input data to a plurality of clusters;
obtain, for each of the plurality of clusters, a second feature vector based on the first model;
estimate, for each cluster of the plurality of clusters, a similarity between the first feature vector and the second feature vector;
determine at least one cluster of the plurality of clusters for which the similarity is lower than a similarity threshold; and
perform data augmentation to the at least one cluster to train a neural network, wherein the program instructions executable by a processing unit to further cause the processing unit to:
for each of the at least one cluster,
  perform a plurality of augmentation methods on the cluster to obtain a plurality of augmented clusters;
  for each cluster of the plurality of augmented clusters,
    obtain a third feature vector for the augmented cluster based on the first model;
    calculate a loss based on the first feature vector and the third feature vector;
  select one of the plurality of augmented clusters for which the loss is the lowest, as an optimal augmented cluster; and
  combine the input data with the respective optimal augmented clusters to train a second model.

12. The computer program product according to claim 11, wherein the program instructions executable by a processing unit to further cause the processing unit to:
for each cluster of the plurality of clusters,
  determine representative data for the cluster, wherein a distance between the representative data and a centroid of the cluster is lower than a distance threshold; and
  obtain the second feature vector for the representative data based on the first model.

13. The computer program product according to claim 11, wherein the similarity is estimated based on a Euclidean distance between the first feature vector and the second feature vector.

14. The computer program product according to claim 11, wherein the first model is a convolutional neural network.

* * * * *